Figure 1:
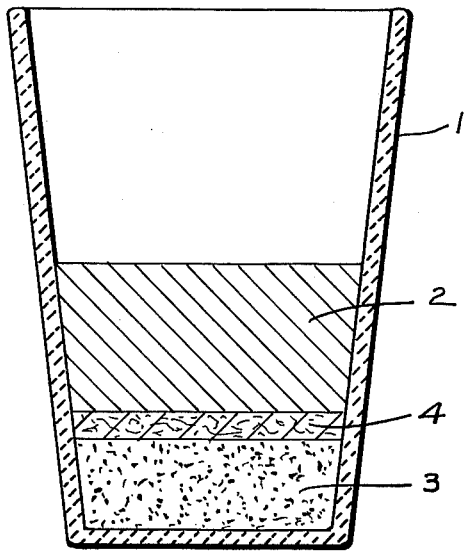

March 15, 1966        C. D. SPEAR        3,240,560
METHOD OF MAKING GAMMA-ALUMINA FIBERS
Filed Oct. 25, 1962        2 Sheets-Sheet 1

INVENTOR.
CARL D. SPEAR
BY
Clarence R Patty, Jr.
ATTORNEY

March 15, 1966 C. D. SPEAR 3,240,560
METHOD OF MAKING GAMMA-ALUMINA FIBERS
Filed Oct. 25, 1962 2 Sheets-Sheet 2

INVENTOR.
CARL D. SPEAR
BY
Clarence R. Patty, Jr.
ATTORNEY 3,240,560
METHOD OF MAKING GAMMA-ALUMINA
FIBERS
Carl D. Spear, Corning, N.Y., assignor to Corning Glass
Works, Corning, N.Y., a corporation of New York
Filed Oct. 25, 1962, Ser. No. 232,960
5 Claims. (Cl. 23—142)

This invention relates to the manufacture of fibers of aluminum oxide or alumina. More specifically, this invention relates to the manufacture of fibers of gamma-alumina.

The tremendous effort which has been devoted in recent years to man's attempt to conquer outer space has manifested the need for strengthening and otherwise improving structural metals. One method which has been proposed for obtaining these desired improvements in physical properties contemplates the utilization of the strength available in fine non-metallic crystal filaments or whiskers in suitable composite materials. Two of the anticipated advantages which are presumed will result therefrom are the reduction in weight of equivalent structures and the extension of the useful range of temperature resistance. Suitably designed composites comprised of strong refractory inorganic fibers in appropriate metal matrices will find application in missile, spacecraft, and aircraft designs.

Another characteristic inherent in alumina fibers which enables them to be useful in applications other than as reinforcing elements is their substantially complete resistance to wetting by any of a host of metals, from low melting point metals to high temperature alloys such as the Nichromes and Monels.

Three methods have been proposed in the literature and implemented for manufacturing alumina fibers. The first method consists essentially of heating high purity aluminum metal melts under carefully controlled conditions in an atmosphere of hydrogen. The presence of controlled amounts of moisture in the hydrogen atmosphere facilitates the formation of a volatile and relatively stable aluminum suboxide ($Al_2O$). The volatile suboxide species reacts with certain silicon-containing compounds also caused to be present in the hydrogen atmosphere. The parameters of temperature, moisture content of the atmosphere, and time are the controlling factors in the growth of alumina fibers.

The second method of producing alumina fibers is the so-called solution process which involves the evaporation of specific stabilized suspensions under carefully controlled conditions followed by heat treatment of the resultant fibers. The degree of fiber formation is primarily dependent upon the concentration of pH of the suspensions.

The third method of preparing alumina fibers comprehends the formation of a volatile suboxide of aluminum by passing a stream of hydrogen containing a significant amount of moisture over molten aluminum, and thereafter moving this suboxide species of aluminum in vapor form, in the presence of significant amounts of aluminum metal, into physical contact with a surface having a lower heat of formation than alumina, such surface generally being composed of silica or compounds containing silica. This method results in the formation of sapphire fibers whose chemistry and structure is substantially equivalent to alpha-alumina.

These techniques, while effective in producing fibers of alumina, have given but small yields when viewed with respect to the starting materials. Also, the size of the fibers was far from uniform and generally were submicroscopic. There has thus been needed a practical method to produce alumina fibers in such quantities and of such size so that the remarkable physical and chemical properties of these fibers can be fully utilized.

Investigators have not been in agreement as to a consistent system for naming the numerous crystal forms of alumina. Nevertheless, gamma-alumina is the designation currently reported in the literature for the oxidation product of aluminum above about 450° C. It has been assigned a defect spinel structure, $Al_{21\ 1/2}\ O_{32}$-cubic system, $A_0 = 7.90$. The phase transformation sequence of gamma-alumina is:

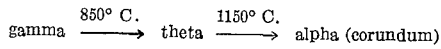

$$\text{gamma} \xrightarrow{850°\ C.} \text{theta} \xrightarrow{1150°\ C.} \text{alpha (corundum)}$$

The literature has recorded that fibers of alumina which are substantially free from impurities are extremely strong, flexible, and stable at high temperature, thus rendering them potentially exceptionally useful as reinforcing elements in plastics, glasses, and metals.

Therefore, the principal object of my invention is to provide a method for making fibers of gamma-alumina which are relatively uniform in size with lengths up to an inch and longer.

Another object of my invention is to provide a method for producing large fibers of gamma-alumina wherein, under controlled conditions, the yield of fibers is large, thus resulting in a highly efficient operation.

A further object of my invention is to provide a method for producing long fibers of gamma-alumina which would be relatively simple in operation, economical in practice, and which would use readily available and relatively inexpensive starting materials.

A still further object of my invention is to provide a method for producing long fibers of gamma-alumina which would be particularly suitable as reinforcing elements in plastics, glasses and metals.

FIGURE 1 is a diagrammatic presentation of apparatus suitable for producing fibers of gamma-alumina in accordance with the present invention.

Figure 2:
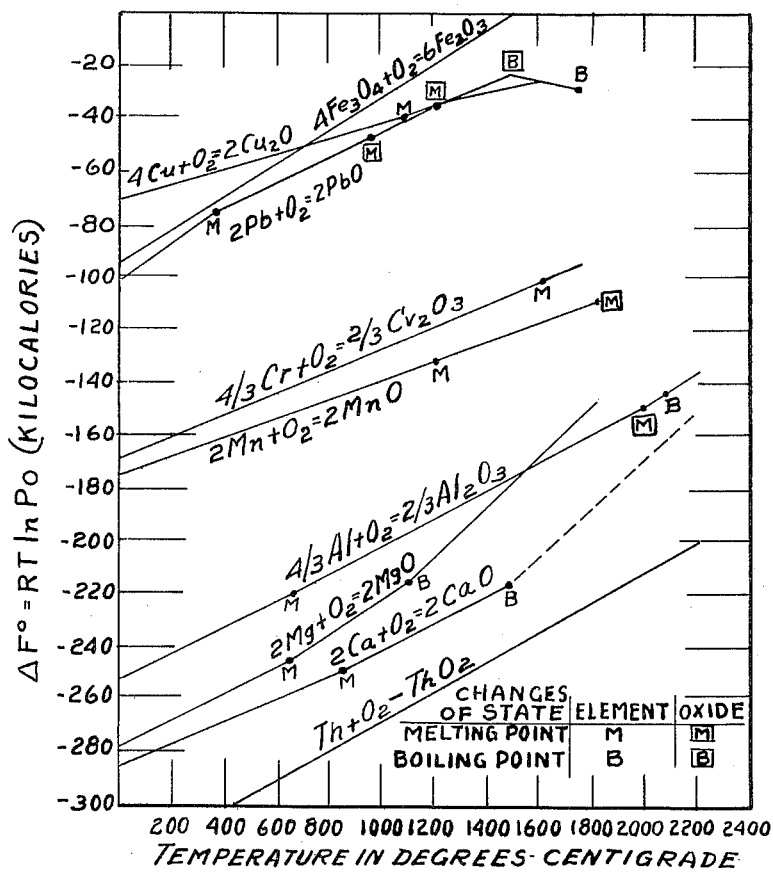

FIGURE 2 comprises a chart depicting the free energies of formation of several metal oxides at various temperatures.

I have discovered that the objects of this invention can be attained through the reaction of aluminum metal with a metal oxide. Broadly speaking, the necessary components for the reaction are: a source of oxygen, i.e., a metal oxide; aluminum metal; a promoter comprising at least one member of the group consisting of potassium, rubidium, cesium, their respective oxides, and compounds thereof thermally decomposable to the corresponding oxide; and means for conducting the reaction in an air-free environment.

The method of my invention can best be described with reference to FIGURE 1, which is submitted by way of illustration and not by may of limitation, wherein 1 depicts a crucible for holding the reaction, 2 represents a mixture of metal oxide and the alkali promoter, 3 designates molten aluminum metals, and 4 indicates the area of fiber growth. In carrying out the invention, the metal oxide powder and alkali metal salt are placed in the bottom of the crucible, molten aluminum poured into the crucible to cover the base layer, and the reaction vessel then placed into a furnace maintained at some desired temperature. The molten aluminum reacts with the other ingredients to produce a fibrous aluminum oxide product which grows at the interface between the molten aluminum and the base layer of materials. In many instances, the aluminum oxide product was so abundant that the aluminum was pushed out of the crucible. The metal oxide is reduced to the elemental state and remains in the bottom of the crucible. Electron diffraction data have shown these fibers to be predominantly gamma-alumina.

I have learned that metal oxides, which have a more positive free energy for their formation than aluminum oxide, when used in conjunction with an alkali metal promoter, will cause fiber formation. Such oxides include: lead, copper, iron, cobalt, nickel, chromium, titanium, manganese, zinc, molybdenum, mercury, tin, and silicon. Experimentation has shown that the amount of promoter to be combined with these metal oxides should range between 0.25 and 10 weight percent. Finally, the temperature of satisfactory growth of gamma-alumina fibers has been determined to be between about 700°–1000° C. with a reaction time sufficient to attain the desired fiber formation, generally 0.5–72 hours.

It will be understood that the quantity of fibers formed is dependent upon the quantity of metal oxide plus promoter brought into contact with the molten aluminum. Thus, where but a very small amount of metal oxide plus promoter is present, there will be fiber growth, but the quantity will be small. I have learned that addition of about 70 grams of molten aluminum to about 5 grams of metal oxide plus promoter is sufficient to maintain proper reaction conditions in a crucible of 50 ml. capacity.

As explained above, a closed system is necessary for the growth of fibers. In the following examples, as set forth in Table I, the reaction vessel consisted of a 96% silica crucible which had been previously reacted with molten alumina, in accordance with the method set forth in U.S. Patent No. 3,034,908. Five grams of a metal oxide and promoter mixture were placed in the bottom of the crucible. In these examples, $Cs_2CO_3$ was utilized to supply the alkali metal oxide promoter, it decomposing at 610° C. 70 grams of molten aluminum was then poured into the crucible and the reaction vessel transferred to a muffle furnace maintained at 850° C. The molten aluminum wet the crucible and thereby furnished a closed system for the reaction. Other ceramic crucible materials did not exhibit this feature and fibers would not grow unless a protective atmosphere such as argon was used. The reaction vessel was retained within the furnace for a period of about 16 hours. The vessel was then removed, cooled, and its contents examined for fiber growth. Table I records the results of these studies.

Table I

| No. | Metal Oxide | Promoter Present as $Cs_2O$ in Weight Percent | Remarks |
|---|---|---|---|
| 1 | PbO | 2.5 | Good growth of fibers. |
| 2 | $Cu_2O$ | 3.9 | Do. |
| 3 | $Fe_3O_4$ | 2.5 | Do. |
| 4 | CoO | 7.8 | Do. |
| 5 | $Ni_2O_3$ | 3.6 | Fair growth of fibers. |
| 6 | $Cr_2O_3$ | 3.9 | Do. |
| 7 | $TiO_2$ | 6.7 | Do. |
| 8 | $MnO_2$ | 6.8 | Do. |
| 9 | ZnO | 7.2 | Small growth of fibers. |
| 10 | $MoO_3$ | 3.9 | Do. |
| 11 | HgO | 2.7 | Very small growth of fibers. |
| 12 | $SiO_2$ | 9.1 | Do. |
| 13 | $SnO_2$ | 3.9 | Do. |

This table illustrates that there are a number of metal oxides which will react with molten aluminum to yield fibrous gamma-alumina. The large number of different oxides that produce fibers indicates that their role in the reaction is merely that of a source of oxygen. It will also be observed that the metal oxide-molten aluminum reactions which are the most favorable thermodynamically produce the largest fibrous growths. Thus, although the best oxides for the reaction are PbO, $Cu_2O$, and $Fe_3O_4$, it has been learned that the oxides of many other metals, such as thallium, cadmium, tungsten, tellurium, boron, and bismuth, which have a more positive free energy for their formation than alumina, will also supply the oxygen needed to form fibrous gamma-alumina. This thermodynamic principle is illustrated in FIGURE 2 wherein the free energy, expressed in kilocalories, is plotted against the temperature in degrees centigrade. This graph serves to define what is meant in this specification by a more positive free energy. The oxides $Cu_2O$, $Fe_3O_4$, PbO, $Cr_2O_3$, and MnO are seen to be represented by lines above that of $Al_2O_3$, i.e., they have a demonstrably more positive free energy for their formation than $Al_2O_3$. Conversely, the alkaline earth oxides MgO and CaO are presented by lines lower than the $Al_2O_3$ (at the temperatures workable in this invention) and have, therefore, a less positive free energy for their formation than $Al_2O_3$. It is the former group which will oxidize the aluminum to alumina.

Table II sets forth a list of various alkali metal and alkali metal oxides which were examined for their catalytic effect on fiber growth. Cesium carbonate appeared to be the most powerful promoter of the fibrous reaction. Potassium and rubidium were also effective in producing fibers but sodium and lithium were inoperative. No correlation could be drawn between the anion in the salt and fiber promotion. Each example was compounded similarly to that described in relation to the examples of Table I. The composition of the metal oxide-promoter Table II

| No. | Composition | Promoter Present as Oxide in Weight Percent | Temp., ° C. | Remarks |
|---|---|---|---|---|
| 14 | 97.6 PbO-2.4 $LiNO_3$ | 0.52 | 720 | No fibers. |
| 15 | 98.2 PbO-1.8 $NaNO_3$ | 0.66 | 750 | Do. |
| 16 | 97.2 PbO-2.8 $NaC_2H_3O_2$ | 1.07 | 750 | Do. |
| 17 | 93.4 $Fe_2O_3$-6.6 Na | | 720 | Do. |
| 18 | 98 PbO-2 $KNO_3$ | 0.94 | 720 | Good growth of fibers. |
| 19 | 98.6 $Cu_2O$-1.4 K | | 750 | Do. |
| 20 | 90.6 $Fe_2O_3$-9.4 K | | 1,000 | Slight growth of fibers. |
| 21 | 96.6 $Cu_2O$-3.4 $K_2SO_4$ | 1.8 | 750 | Do. |
| 22 | 97.4 $Cu_2O$-2.6 $K_2CO_3$ | 1.8 | 750 | Do. |
| 23 | 94.2 $Cu_2O$-5.8 $K_2Cr_2O_7$ | 1.93 | 750 | Do. |
| 24 | 96.6 $Cu_2O$-3.4 $KNO_2$ | 1.91 | 750 | Fair yield of fibers. |
| 25 | 99 $Cu_2O$-1 $Rb_2CO_3$ | 0.74 | 800 | Slight growth of fibers. |
| 26 | 97 $Cu_2O$-3 $Rb_2CO_3$ | 2.2 | 800 | Good growth of fibers. |
| 27 | 91 $Cu_2O$-9 $Rb_2CO_3$ | 7.3 | 800 | Fair growth of fibers. |
| 28 | 96.7 PbO-3.3 $Cs_2CO_3$ | 2.9 | 750 | Good growth of fibers. | mixture is expressed in weight percent. The amount of promoter present is also expressed in weight percent on an oxide basis except where the alkali metal itself constituted the promoter. The time of reaction was again 16 hours and the crucibles designed from aluminum-reacted 96% silica crucibles.

Table III sets forth examples designed to determine the amount of promoter and the time of reaction necessary to cause the growth of fibers. Cuprous oxide ($Cu_2O$) was selected for this study because it is thermodynamically one of the most favorable for the oxidation of aluminum. The two alkali metal compounds, $KNO_3$ and $Cs_2CO_3$, were utilized as promoters. These examples were compounded and treated as described previously with regard to Tables I and II, except the reaction time in the furnace was held to 24 hours. The composition of the metal oxide-promoter is again expressed in weight percent and the length of the fibers comprises a fairly rough approximation of the average length of the fibers.

some fiber growth occurring as high as 1000° C. Electron diffraction data has indicated that the fibers produced in the temperature range of 700°–850° C. are substantially all gamma-$Al_2O_3$. However, fibrous growths obtained at temperatures higher than these, particularly where the temperatures were as high as about 1000° C., were not as sharply defined and appeared to have some amorphous material interspersed therewith. These factors have led to the adoption of reaction temperatures within the range of 700°–850° C. and an amount of promoter varying from 3–8 weight percent as the preferred practice.

Table IV reports a study of the time necessary for reaction of molten aluminum with the metal oxide-promoter material. The metal oxide-promoter levels which gave the best yields in Table III, vis., 91 $Cu_2O$-9$Cs_2CO_3$ and 96 $Cu_2O$-4$KNO_3$, were utilized. The crucibles were removed from the furnace at selected intervals and the length and weight of the fibers measured. The examples

Table III

| No. | Composition | Promoter Present as Oxide in Weight Percent | Temp., ° C. | Average Fiber Length, mm. | Remarks |
|---|---|---|---|---|---|
| 29 | 99.5 $Cu_2O$-0.5 $KNO_3$ | 0.23 | 710 | 0.5 | Slight yield. |
| 30 | 99.0 $Cu_2O$-1.0 $KNO_3$ | 0.5 | 710 | 1.2 | Fair yield. |
| 31 | 97.0 $Cu_2O$-3.0 $KNO_3$ | 1.4 | 710 | 2.0 | Good yield. |
| 32 | 92.5 $Cu_2O$-7.5 $KNO_3$ | 3.5 | 710 | 2.0 | Do. |
| 33 | 90.0 $Cu_2O$-10.0 $KNO_3$ | 4.6 | 710 | 1.5 | Poor yield with some nonfibrous material. |
| 34 | 98 $Cu_2O$-2 $KNO_3$ | 0.9 | 750 | 5 | Good yield. |
| 35 | 96 $Cu_2O$-4 $KNO_3$ | 1.86 | 750 | 7 | Do. |
| 36 | 94 $Cu_2O$-6 $KNO_3$ | 2.8 | 750 | 3 | Fair yield. |
| 37 | 96 $Cu_2O$-4 $Cs_2CO_3$ | 3.5 | 840 | 6 | Do. |
| 38 | 94 $Cu_2O$-6 $Cs_2SO_3$ | 5.2 | 840 | 10 | Do. |
| 39 | 92 $Cu_2O$-8 $Cs_2CO_3$ | 7.0 | 840 | 10 | Good yield. |
| 40 | 91 $Cu_2O$-9 $Cs_2CO_3$ | 7.8 | 850 | 13 | Do. |
| 41 | 90 $Cu_2O$-10 $Cs_2CO_3$ | 8.7 | 840 | 10 | Fair yield. |
| 42 | 88 $Cu_2O$-12 $Cs_2CO_3$ | 10.5 | 850 | 9.5 | Non-fibrous material. |

A study of this table and Table II enables several pertinent conclusions to be drawn. At least about 0.25 weight percent of alkali metal promoter is necessary to promote the formation of fibrous gamma-alumina. Where more than about 10 weight percent of alkali metal or alkali metal oxide is present, the gamma-alumina product exhibits less desirable fiber development and, in some instances, had a chalky appearance. The optimum growth range appears to be about 700–850° C., with were compounded in accordance with that described in Tables I–III.

Table IV

| No. | Composition | Promoter Present as Oxide in Weight Percent | Temp., ° C. | Heating Time | Weight (Grams) | Average Fiber Length, mm. | Remarks |
|---|---|---|---|---|---|---|---|
| 43 | 91 $Cu_2O$-9 $Cs_2CO_3$ | 7.8 | 850 | 12 mins | | | Not enough to measure. |
| 44 | 91 $Cu_2O$-9 $Cs_2CO_3$ | 7.8 | 850 | 22 mins | 0.13 | 2 | Fine fibers. |
| 45 | 91 $Cu_2O$-9 $Cs_2CO_3$ | 7.8 | 850 | 36 mins | 0.38 | 3 | Do. |
| 46 | 91 $Cu_2O$-9 $Cs_2CO_3$ | 7.8 | 850 | 1 hr | 0.91 | 6 | Gray fibers. |
| 47 | 91 $Cu_2O$-9 $Cs_2CO_3$ | 7.8 | 850 | 3 hrs | 0.97 | 17 | Do. |
| 48 | 91 $Cu_2O$-9 $Cs_2CO_3$ | 7.8 | 850 | 7 hrs | 1.04 | 15 | White fibers. |
| 49 | 91 $Cu_2O$-9 $Cs_2CO_3$ | 7.8 | 850 | 24 hrs | 1.09 | 15 | Do. |
| 50 | 91 $Cu_2O$-9 $Cs_2CO_3$ | 7.8 | 800 | 24 mins | 0.07 | 2 | Fine fibers. |
| 51 | 91 $Cu_2O$-9 $Cs_2CO_3$ | 7.8 | 800 | 1 hr | 0.21 | 3 | Do. |
| 52 | 91 $Cu_2O$-9 $Cs_2CO_3$ | 7.8 | 800 | 5 hrs | 1.82 | 19 | White fibers. |
| 53 | 91 $Cu_2O$-9 $Cs_2CO_3$ | 7.8 | 800 | 6 hrs | 1.85 | 18 | Do. |
| 54 | 91 $Cu_2O$-9 $Cs_2CO_3$ | 7.8 | 750 | 2 hrs | 0.55 | 12 | Fine fibers. |
| 55 | 91 $Cu_2O$-9 $Cs_2CO_3$ | 7.8 | 750 | 19 hrs | 1.60 | 20 | White fibers. |
| 56 | 91 $Cu_2O$-9 $Cs_2CO_3$ | 7.8 | 750 | 24 hrs | 1.61 | 20 | Do. |
| 57 | 96 $Cu_2O$-4 $KNO_3$ | 1.9 | 750 | 3 hrs | 0.30 | 6 | Do. |
| 58 | 96 $Cu_2O$-4 $KNO_3$ | 1.9 | 750 | 7 hrs | 0.80 | 10 | Do. |
| 59 | 96 $Cu_2O$-4 $KNO_3$ | 1.9 | 750 | 24 hrs | 1.25 | 12 | Do. |
| 60 | 96 $Cu_2O$-4 $KNO_3$ | 1.9 | 800 | 1 hr | 0.20 | 3 | Fine fibers. |
| 61 | 96 $Cu_2O$-4 $KNO_3$ | 1.9 | 800 | 3 hrs | 0.65 | 5 | Gray fibers. |
| 62 | 96 $Cu_2O$-4 $KNO_3$ | 1.9 | 800 | 5 hrs | 1.10 | 6 | White fibers. |
| 63 | 96 $Cu_2O$-4 $KNO_3$ | 1.9 | 800 | 7 hrs | 1.40 | 10 | Do. |
| 64 | 96 $Cu_2O$-4 $KNO_3$ | 1.9 | 850 | 1 hr | 0.40 | 4 | Fine fibers. |
| 65 | 96 $Cu_2O$-4 $KNO_3$ | 1.9 | 850 | 3 hrs | 1.20 | 8 | White fibers. |
| 66 | 96 $Cu_2O$-4 $KNO_3$ | 1.9 | 850 | 5 hrs | 1.40 | 9 | Do. |
| 67 | 96 $Cu_2O$-4 $KNO_3$ | 1.9 | 850 | 7 hrs | 1.85 | 10 | Do. |

From this table it can readily be seen that the reaction is often essentially complete within 7 hours. That is to say, although an extended holding period in a heating chamber say, for example, 24 hours or even 72 hours will cause a greater formation of fibers, the percentage increase after 7 hours is small. For this reason, my preferred practice utilizes a reaction time of about 5–7 hours and 72 hours has been viewed as a maximum reaction time for practical reasons, although a longer time could be used successfully. The fiber growth obtained in less than one-half hour is usually of such small size and quantity that this period has been deemed the minimum practical reaction time.

Table V sets forth several examples wherein a combination of metal oxides was used in conjunction with a promoter to determine the effect on fiber growth. The metal oxides and promoter were blended together, the molten aluminum added, and the crucible placed in a furnace in the same manner as described above. The reaction time in all instances was seven hours and the compositions are expressed in mole percent.

is equal to $r/R$ where L and $r$ are the length and radius of the fiber and R is the radius of curvature of the bend. Thus, the strength (S) in lb./in.$^2$ is equal to:

$$S = E \cdot \Delta L / L = E \cdot r / R$$

where E designates Young's modulus. Strengths ranging from about 100,000 to 800,000 p.s.i. were recorded. However, in these calculations, it must be noted that Young's modulus for alpha-$Al_2O_3$ was utilized as no literature value for gamma-alumina could be located. The radius of the fibers was determined from electron micrographs.

The manner of growth of these fibers is not completely understood. Some of the fibers have uniformly spaced Table V

| No. | Composition | Promoter Present as Oxide in Weight Percent | Temp., °C. | Average Fiber Length, mm. | Remarks |
|---|---|---|---|---|---|
| 68 | 90 PbO-2.0 $Fe_3O_4$-8 $Cs_2CO_3$ | 7.0 | 850 | 17 | Good yield. |
| 69 | 89 PbO-3.0 $Fe_3O_4$-8 $Cs_2CO_3$ | 7.0 | 850 | 19 | Very good yield. |
| 70 | 90 PbO-1 $Fe_3O_4$-1 $TiO_2$—8 $Cs_2CO_3$ | 7.0 | 850 | 11 | Good yield. |
| 71 | 90 PbO-1 $Fe_3O_4$-1 $MnO_2$—8 $Cs_2CO_3$ | 7.0 | 850 | 7 | Fair yield. |
| 72 | 90 $Pb_3O_4$-2 $Fe_3O_4$-8 $Cs_2CO_3$ | 7.0 | 850 | 16 | Good yield. |

An examination of the foregoing tables clearly points out the necessary elements of the invention, viz., reacting aluminum metal at 700°–1000° C. in a closed system with a metal oxide having a more positive free energy of formation than aluminum oxide such as oxides of lead, copper, iron, cobalt, nickel, chromium, titanium, manganese, zinc, molybdenum, mercury, tin, silicon, and mixtures thereof, and a promoter comprising at least one alkali metal selected from the group consisting of potassium, rubidium, cesium, and compounds thereof thermally decomposable to the corresponding oxide. As noted previously, the great number of metal oxides and the variations in valence states which will act to produce the gamma-$Al_2O_3$ fibers demonstrates that their presence is required only as a source of oxygen. Also, as mentioned previously, the anion of the alkali metal salt promoter does not appear to have a critical effect upon the reaction. For fibers of the highest purity and versatility, an aluminum metal of high purity should be utilized. I have found Code #1100 aluminum produced by the Aluminum Company of America and having a lower limit of 99% aluminum, to be an excellent source for fiber production. This metal was employed in the examples set forth above. As can be readily understood, the purities of the metal oxide and the promoter are not as critical to the invention and these materials may be either the alkali metals themselves, their oxides or other compounds which, on being heated, are converted to the oxides.

Electron micrographs have revealed that the fibers formed vary in diameter from about 0.01–1.0 micron. However, in the preferred ranges of reaction times and temperatures, i.e., 5 to 7 hours at 700°–850°C., the great majority of the fibers were of the order of 0.1–1.0 micron in diameter. The tables manifest the differences in lengths of the fibers depending upon batch composition and reaction parameters. Here, again, the greatest yields and longest lengths of fibers were produced through the preferred practice, fibers of 20 mm. or one inch in length and longer being not uncommon.

An approximation of the strength of the fibers was made utilizing Hooke's law. The fibers were glued to a glass cover slide and this composite then inserted between two glass slides. A probe was used to bend the fibers and the radius of curvature observed with a light microscope. The longitudinal strain $\Delta L/L$ in the fiber bands which are perpendicular to their length. This would suggest that the fibers grew in a periodic manner similar to Liesegang ring formation (a periodic crystallization). Yet the band spacings do not fit equations for Liesegang type crystallization. Where extreme banding occurred, the fibers were disrupted or broken. Periodic growth suggests the bands form when the conditions for fiber growth were slightly unfavorable and if the conditions were extremely unfavorable the fibers terminated.

It will be understood that modification in the design of the reaction apparatus and in the sequence of operations may be made without departing from the scope of my invention so long as the required interrelation of composition, temperature, and time is observed. Thus, a reaction vessel other than the described crucible is recognized as being completely feasible.

What is claimed is:

1. A method of making long fibers of gamma-alumina comprising reacting aluminum metal in a closed system with a mixture of about 90–99.75 weight percent of at least one metal oxide which has a more positive free energy of formation than aluminum oxide and about 0.25–10 weight percent of a promoter comprising at least one member of the group consisting of potassium, rubidium, cesium, their respective oxides, and compounds thereof thermally decomposable to the corresponding oxide, at about 700°–1000° C. for a period of time sufficient to attain the desired fiber formation.

2. A method of making long fibers of gamma-alumina in accordance with claim 1 wherein the time sufficient to attain the desired fiber formation is at least about 0.5 hour, but not more than about 72 hours.

3. A method of making long fibers of gamma-alumina comprising containing a mixture of about 90–99.75 weight percent of at least one metal oxide which has a more positive free energy of formation than aluminum oxide and about 0.25–10 weight percent of a promoter comprising at least one member of the group consisting of potassium, rubidium, cesium, their respective oxides, and compounds thereof thermally decomposable to the corresponding oxide, with molten aluminum metal in a reaction vessel providing a closed system, and maintaining said reaction vessel at about 700°–1000° C. for a period of time sufficient to attain the desired fiber formation.

4. A method of making long fibers of gamma-alumina in accordance with claim 3 wherein the time sufficient to attain the desired fiber formation is at least about 0.5 hour, but not more than about 72 hours.

5. A method of making long fibers of gamma-alumina comprising contacting a mixture of about 92–97 weight percent of at least one metal oxide which has a more positive free energy of formation than aluminum oxide and about 3–8 weight percent of a promoter comprising at least one member of the group consisting of potassium, rubidium, cesium, their respective oxides, and compounds thereof thermally decomposable to the corresponding oxide, with molten aluminum metal in a reaction vessel providing a closed system, and thereafter heating said reaction vessel at about 700°–850° C. for about 5–7 hours.

References Cited by the Examiner

UNITED STATES PATENTS

| | | | |
|---|---|---|---|
| 2,810,635 | 10/1957 | Cooper | 23—142 X |
| 3,011,870 | 12/1961 | Webb et al. | 23—142 |
| 3,077,380 | 2/1963 | Wainer et al. | 23—142 |
| 3,147,085 | 9/1964 | Gatti | 23—142 X |

FOREIGN PATENTS

| | | |
|---|---|---|
| 508,032 | 11/1960 | Canada. |
| 118,606 | 6/1919 | Great Britain. |

MAURICE A. BRINDISI, *Primary Examiner.*